(12) United States Patent
Dybov et al.

(10) Patent No.: US 10,077,283 B2
(45) Date of Patent: Sep. 18, 2018

(54) PROCESS FOR FRACTIONATING LIGNOCELLULOSICS

(71) Applicant: ANNIKKI GMBH, Graz (AT)

(72) Inventors: Alexander Dybov, Graz (AT); Bernd Mayer, Graz (AT); Christopher Lucas Prince, Ithaca, NY (US)

(73) Assignee: ANNIKKI GMBH, Graz (AT)

( * ) Notice: Subject to any disclaimer, the term of this patent is extended or adjusted under 35 U.S.C. 154(b) by 0 days.

(21) Appl. No.: 15/037,650

(22) PCT Filed: Nov. 19, 2014

(86) PCT No.: PCT/EP2014/075041
§ 371 (c)(1),
(2) Date: May 18, 2016

(87) PCT Pub. No.: WO2015/075080
PCT Pub. Date: May 28, 2015

(65) Prior Publication Data
US 2016/0289255 A1    Oct. 6, 2016

(30) Foreign Application Priority Data
Nov. 20, 2013   (EP) .................................. 13193595

(51) Int. Cl.
*C07G 1/00*   (2011.01)
(52) U.S. Cl.
CPC ....................................... *C07G 1/00* (2013.01)
(58) Field of Classification Search
CPC ............... C07G 1/00; C08H 6/00; C08H 8/00
See application file for complete search history.

(56) References Cited

U.S. PATENT DOCUMENTS

| | | | |
|---|---|---|---|
| 5,770,010 A * | 6/1998 | Jelks ...................... | D21C 3/006 162/19 |
| 8,309,694 B2 | 11/2012 | Belanger et al. | |
| 2009/0062516 A1 | 3/2009 | Belanger et al. | |
| 2010/0159522 A1 | 6/2010 | Cirakovic | |
| 2013/0005952 A1 | 1/2013 | Belanger et al. | |
| 2013/0078677 A1 * | 3/2013 | Fackler ................... | C12P 7/14 435/99 |
| 2015/0122429 A1 * | 5/2015 | Dybov .................... | D21C 3/00 162/14 |

FOREIGN PATENT DOCUMENTS

| | | |
|---|---|---|
| CA | 2810455 | 4/2012 |
| DE | 4103572 | 8/1992 |
| DE | 19702769 | 7/1998 |
| WO | WO92013849 | 8/1992 |
| WO | WO1996041052 | 12/1996 |
| WO | WO2007129921 | 11/2007 |
| WO | WO2009092749 | 7/2009 |
| WO | WO2011014894 | 2/2011 |
| WO | WO 2011014894 A2 * | 2/2011 ............... C12P 7/14 |
| WO | WO2011149341 | 12/2011 |
| WO | WO2012027767 | 3/2012 |
| WO | WO2013164234 | 11/2013 |

OTHER PUBLICATIONS

Aimi, Hikaru, Yuji Matsumoto, and Gyosuke Meshitsuka. "Structure of small lignin fragment retained in water-soluble polysaccharide extracted from sugi MWL isolation residue." Journal of wood science 50.5 (2004): 415-421.*
Aimi, Hikaru, Yuji Matsumoto, and Gyosuke Meshitsuka. "Structure of small lignin fragments retained in water-soluble polysaccharides extracted from birch MWL isolation residue." Journal of wood science 51.3 (2005): 303-308.*
Abstract from the Conservation Information Network, Björkman, Anders. "Studies on finely divided wood. Part 1. Extraction of lignin with neutral solvents." Svensk papperstidning 59.13 (1956), 1 page abstract.*
"Methods in Lignin Chemistry", edited by S.Y. Lin and C.W. Dence, Springer-Verlag Berlin Heidelberg 1992.
Smook, Handbook for Pulp & Paper Technologies, 2nd Edition, Angus Wilde Publications (1992).
Arato et al., "The Lignol approach to biorefining of woody biomass to produce ethanol and chemicals", Appl. Biochem. Biotechnol., 2005 Spring; vol. 121-124: 871-882.
Azuma et al., "Isolation and Characterisation of Lignin-Carbohydrate Complexes from the Milled-Wood Lignin Fraction of Pinus densiflora Sieb. Et. Zucc.", Carbohydrate Research (1981) 93, 91-104**.
Conchie et al., "Soluluble Lignin-Carbohydrate Complexes from Sheep Rumen Fluid: Their Composition and Structural Features", Carbohydrate Research 177 (1988), 127-151.

(Continued)

*Primary Examiner* — Nicholas E Hill
(74) *Attorney, Agent, or Firm* — Workman Nydegger

(57) ABSTRACT

A method for the isolation of lignin from a lignocellulosic biomass, comprising providing a lignocellulosic biomass; extracting sugar free lignin from the lignocellulosic biomass by contacting said biomass with an organic aqueous solution comprising water and at least one water miscible organic solvent, either discontinuously or continuously, whereby a biomass-solvent suspension is formed; separating the sugar free lignin solution from the biomass-solvent suspension to obtain a sugar free lignin solution and a cellulosic material enriched with lignin carbohydrate complexes and hemicellulose, and optionally isolating sugar free lignin from the sugar free lignin solution; extracting the lignin carbohydrate complexes from the cellulosic material enriched with lignin carbohydrate complexes and hemicellulose by contacting said cellulosic material with a liquid comprising at least water, whereby treated biomass suspension is formed; separating the lignin carbohydrate complexes solution from said treated biomass suspension to obtain a lignin carbohydrate complexes solution and cellulosic material enriched with hemicellulose, and, optionally isolating lignin carbohydrate complexes from the solution obtained and isolating further sugar free lignin from the mother liquor of said lignin carbohydrate complexes isolation, optionally after combining the mother liquor of said lignin carbohydrate complexes isolation with the sugar free lignin solution obtained from extracting sugar free lignin from the lignocellulosic biomass.

18 Claims, No Drawings

(56) References Cited

OTHER PUBLICATIONS

El-Sakhawy et al., "Organosolv pulping. 4. Kinetics of Alkiline Ethanol Pulping of Wheat Straw", Cellulose Chemistry Technology, Apr. 11, 1995, 30, 281-296.

Hergert, "Developments in organosolv pulping—An Overview", Environmentally Friendly Technologies for the Pulp and Paper Industry, 1998, New York, 5-68.

Lawoko et al., "Characterisation of lignin-carbohydrate complexes (LCCs) of spruce wood (*Picea abies* L.) isolated with two methods", Holzforschung, 2006, vol. 60, pp. 156-161, New York.

Lawoko, "Lignin Polysaccharide Networks in Softwood and Chemical Pulps: Characterisation, Structure and Reactivity", KTH Chemical Science and Engineering, 2005, Stockholm.

Li et al., "Fractionation and characterization of lignin-carbohydrate complexes (LCCs) from eucalyptus fibers", Holzforschung, (2011) 65, 43-50.

Lu et al, "Non-degradative dissolution and acetylation of ball-milled plant cell walls: high-resolution solution-state NMR", The Plant Jouranl, 2003, 35, 535-544.

Marton, "Lignins: Occurrence, formation, structure and reactions" Wiley-Interscience, 1971, Eds. Sarkanen K.V. and Ludwig C.H., USA, p. 666.

Morrison, "Isolation and Analysis of Lignin-Carbohydrate Complexes from Lolium Multiflorum", Phytochemistry (1973) 12, 2979-2884.

Morrison, "Lignin-Carbohydrate Complexes from Lolium Perenne", Phytochemistry (1974) 13, 1161-1165.

Sipponen et. al, "Isolation of structurally distinct lignin-carbohydrate fractions from maize stem by sequential alkaline extractions and endoglucanase treatment", Bioresource Technology (2013) 133, 522-528.

Sjöholm et. al, "Aggregration of cellulose in lithium chloride/N,N-dimethylacetamide", Carbohydrate Polymers (2000) 41, 153-161.

Xu et al., "Comparative study of organosolv lignins from wheat stray", Industrial Crops and Products (2006) 23, 180-193.

Yuan et al: "Characterization of Lignin Structures and Lignin-Carbohydrate Complex (LCC) Linkages by Quantitative 13 C and 2D HSQC NMR Spectroscopy", Journal of Agricultural and Food Chemistry, vol. 59, No. 19, Oct. 12, 2011, pp. 10604-10614.

\* cited by examiner

PROCESS FOR FRACTIONATING LIGNOCELLULOSICS

The present invention relates to a process for fractionating lignocellulosics, in more detail to the separation and isolation of lignin in its purest form from lignocellulosic material to provide sugar free lignin, lignin-carbohydride complex and hemicellulose.

BACKGROUND OF THE INVENTION

In recent years the renewable lignocellulosic materials, herein also designated as "lignocellulosics", such as straw, wood, paper wastes, were attracting increasing attention due to the limitation of raw oil sources on earth.

The idea of using of ligninocellulosics as a potential raw source for fuels and synthetic polymers production is not new. In general, there are two main pathways for the conversion of lignocellulose into valuable intermediates:

1) The "Thermochemical platform", wherein the lignocellulose is converted to low molecular products, such as EtOH, phenolics etc, which may be further converted to desired products; and
2) The "Sugar platform", wherein the polymeric structure of the hemicellulose, cellulose and lignin are of main interest and the desired products are polymers and are built upon the natural polymeric structures.

The present invention follows the second pathway. For that the natural polymeric components lignin, hemicellulose and cellulose are to be separated from each other as pure as possible since the contamination of the sugars in the lignin and vice versa leads to a significant worsening of the isolated material. The lignocellulosic component separation in good purity is very challenging mostly due to the presence of mixed fractions, so-called lignin carbohydrate complexes (LCC), which is a complex mixture of the covalently bound polymeric sugars and lignin.

The classical delignification processes operate with unselective pulping methods, wherein the lignin is removed simultaneously with hemicellulose and LCC at high temperatures, very often in the presence of sulfur containing reagents. The structure of the removed lignin is drastically changed during such treatment that affects its further application in the polymer chemistry. Moreover, the simultaneous removal of lignin, LCC and hemicellulose makes it practically impossible to separate sugars from the lignin to pursue "lignin-in-pure-form-separation". To achieve the high lignin purity the polymeric sugars in the lignin liquor have to be cleaved to their monomers. This makes the use of the natural hemicellulose polymeric structure impossible. In another aspect the LCC might remain in the hemicellulose stream after lignin separation, thus contaminating the hemicellulose products.

A great technical improvement in this area could be the development of a method, by which sugar free lignin is gently separated from the lignocellulosic material, whereby cellulosic material enriched with LCC and hemicellulose is obtained, followed by LCC separation from said material providing the cellulosic material enriched with hemicellulose. That is one task of the present invention.

STATE OF THE ART

Methods of Separating Lignin From Lignoncellulosic Material

A number of methods exists for delignificating lignocellulosic material which found an industrial application and which are used nowadays. Among them there are the "Soda pulping process", "Kraft pulping process", and "Sulfite pulping process". Many examples and detailed descriptions of such techniques may be found e.g. in Handbook for Pulp & Paper Technologies, 2nd Edition, G. A. Smook, Angus Wilde Publications (1992), where, however, mainly the basic concepts of said methods are presented. It is worth mentioning that all said method are focusing on cellulose production and deliver bad quality lignins (contaminated with sugars and/or sulfur containing). The obtained lignins are burned to recover energy.

The "Soda-Process"

The "Soda-Process" was developed by Burgess and Watts in 1851. It does not operate with sulfur containing chemicals. Only sodium hydroxide in water is used as a pulping reagent. To achieve a satisfactory delignification grade the pulping is to be conducted at high temperature (up to 210° C.) leading to highly extended degradation of the polymeric sugars. The use of anthraquinone facilitates the lignin removal ("soda-anthraquinone-technique") and makes this method industrially applicable.

The "Sulfite-Process"

The sulfite process was first patented in 1867 by Benjamin Tilghman The process was industrially realized in 1874 in Sweden. A mix of sulfur salts (mostly $Ca^{2+}$ and $Mg^{2+}$) is used as active component in this technique. Varying the counter-ion the process can be carried out at different pH, from strong acidic to strong basic conditions. The classical approach operates at strong (calcium) or moderate (magnesium) acidic conditions. The sulfite component modifies the lignin chemically and makes it water soluble. Due to the great influence on ecology the process is not used extensively. However, it is often applied for chemical pulp production since a easily bleachable pulp may be provided.

The "Kraft-Process"

The Kraft process was developed in 1884 by Carl Ferdinand. The technique implies the treatment of the pulp with a mixture of sodium sulfate, sodium carbonate, sodium hydroxide and sodium sulfide at elevated temperature. The lignin is removed from the lignocellulosic material in a form of water soluble alkali-lignin dissolved in black liquor. The lignin after Kraft process contains up to 3% sulfur (see e.g. Marton J., Lignins; Occurrence, formation, structure and reactions, 1971, Wiley-Interscience, Eds. Sarkanen K. V. and Ludwig C. H., USA, p 666). The isolated lignin normally is burned after concentration of the black liquor for energy recovery.

As a relative new concept of lignin separation "organosolv" techniques were presented and the newest strategies ("extended cooking") were developed in the 1970's. That implies the addition of organic solvents to the pulping mixture to increase the lignin solubility and facilitate the subsequent bleaching. Mostly water miscible solvents, such as methanol, ethanol are used, thereby the veritable chemicals (acids, bases, sulfite or sulfide, or oxidative reagents) still serve as a pulping agent (see e.g. H. Hergert, 1998, Developments in organosolv pulping; In: R. A. Young and M. Akhtar, Environmentally friendly technologies for the pulp and paper industry; New York, 5-68).

One example of addition of ethanol to the classical pulping is described in WO1996041052 A1 wherein ethanol water mixtures were used to improve the selectivity of delignification and to increase the delignification rate. To enhance the selectivity the additives such as sodium hydroxide, sodium sulfite, ammonium and magnesium bisulfite and sodium bisulfite are to be added to the cooking solvent.

In general the "organosolv" processes are divided into acidic and basic processes. One of the widely known acidic processes is the Allcell process, which was adopted and further developed by LIGNOL company (C. Arato, E. K. Pye, G. Gjennestad, 2005, The Lignol approach to biorefining of woody biomass to produce ethanol and chemicals; Appl. Biochem. Biotechnol., Vol. 12I-12.871-882). Wood, straw and bagasse are handled as a raw lignocellulosic material. The main chemical reactions during the material treatment is an autohydrolysis of hemicellulose at pH of 3.8 to 2.0, wherein acetic acid is produced as a by-product after cleavage of acetates from the xylan. The normal operating conditions are: 180-195° C., ethanol concentration 35-70%, liquid to solid ratio: 4:1 to 10:1, reaction time ca. 30 to 90 minutes. Thereby the cellulose is converted into insoluble oligomeric sugar and the xylan is dissolved in a form of mono- and oligomeric sugars. A part of pentose is hydrolyzed to furfural. Lignin is partially degraded and is added to the cooking liquor together with other cleavage products. Afterwards lignin and hemicellulose have to be separated. The non-solubilized pulp can be fermented to obtain ethanol. The lignin remaining in the pulp (20% to 25%) is subjected to fermentation and is burned for energy recovery.

In WO 92/013849 A1 a lignin extraction is described wherein the lignocellulosic material is pulped in a water miscible organic solvent, preferably a water miscible lower aliphatic alcohol of 1 to 4 carbon moms, e.g., methanol, ethanol, isopropanol or tert-butanol at elevated temperatures to produce a cooking mixture comprising cellulose pulp and black liquor. Recovery of the lignin from black liquor is indicated. In one embodiment, a small amount of a strong water soluble acid is applied. A method for recovery of organic solvent as well as for furfural is also described.

It can be concluded that the acidic process may offer a relative low delignification grade and the lignin extraction cannot be decoupled from the hemicellulose extraction. Due to the low efficiency of delignification the pulp obtained after lignin and hemicellulose removal must be extensively bleached to fulfill the requirements of chemical or paper pulp. Therefore such pulp is primarily used for bio-ethanol production.

One of the first alkali ethanol process was disclosed in WO 82/01568. The method described therein comprises pulping of wood with a mixture of ethanol and sodium hydroxide for manufacturing wood pulp An industrial basic organosolv process was developed in Germany in the 1990's. (see ee.g. DE4103572; DE19702769). The process consists of two steps. In the first step the lignocellulosic material is impregnated at 110 to 140° C. (EtOH:H$_2$O ratio 3:7). During the second step the cooking is performed whereby the temperature is increased up to 165 to 170° C. with addition of 30% NaOH and 0.1% anthraquinone (based on the dry mass of the material). The process is appropriate for the pulping of hard and softwood as well as for annual plants. The quality of the cellulose obtained is comparable with cellulose obtained by a Kraft process. The industrial plant operating with that technique was closed shortly after starting operation, mostly because of difficulties in sodium hydroxide recycling (El-Sakhawy et al., 1996a: Organosolv pulping, (3), ethanol pulping of wheat straw; Cellul. Chem. Technol. 30, 281-296).

In WO2011/014894 and WO 2012/027767 a low temperature technique for lignin extraction from straw, bagasse, energy grasses and husk is described. The pulping is conducted at temperatures below 100° C. for lignin removal, providing a cellulosic material enriched with hemicellulose. A disadvantage of such low temperature process is a low delignification rate compared to Kraft or Sulfite processes.

In US 2010/159522 a method of lignin extraction is described wherein the lignin is extracted from the lignocellulosic material using organic solvent comprising water and at least one inorganic base. The obtained pretreated biomass is contacted with a gas comprising ozone whereby a readily saccharifiable carbohydrate-enriched biomass is described to be produced.

In US 2013/0005952 and US 2009/0062516 a new method of using ethanol/water mixtures for lignin extraction is indicated. No additional chemicals are applied. The extraction is carried out at temperature in the range of 170 to 210° C. The delignification rate is low compared with classical pulping (Kraft and Sulfite processes). The hemicellulose obtained can be extracted in the next step replacing the ethanol water mixture by water.

In WO 2011/149341 an acidic organosolv process is described wherein an "ionic liquid" in combination with an organic acid is applied for lignocellulose dissolution. The fractionation is realized by means of fractional precipitation of the dissolved lignocellulosic material. The addition of an alcohol results in precipitation of the cellulose, the further addition of water to the supernatant gives the lignin as a precipitate. The hemicellulose is converted into furfural without intermediary isolation.

From WO 2009/092749 and CA 2810455 a process for pretreating the lignocellulosic material is known, wherein the lignocellulosic material is treated with a water mixture containing formic acid at a reaction temperature between 95 and 110° C. That method allows the separation of lignin and hemicellulose from the cellulose and is close to the Allcell process by its concept. The obtained cellulose has a bad quality and is suitable for bio-ethanol production only. An advantage of using formic or acetic acid over ethanol or methanol consists in higher delignification rate and low temperature in the pretreatment (R. Sun, Industrial Crops and Products (2006) 23, 180-193).

In WO 2013/164234 there is described to remove hemicellulose from a biomass which is obtained after separation of a lignin solution. The material which is hemicellulose depleted is then treated with sulfite or oxygen.

According to Tong-Qi Yuan et al, Journal of Agricultural and food chemistry, vol. 59, no. 19, 2011, 10604-10614 as a first step dried starting material is pre-extracted wirth an organic solvent mixture. The remaining material is milled which milling renders the the cellulose contained in said material unusable for further application.

In WO 92/13849 a process is described wherein plant fibre material is impregnated with organic solvent and extracted therewith in several steps whereupon a mixture of black liquor comprising lignin and a cellulose pulp results. The black liquor obtained is removed and the remaining cellulose pulp is bleached. Lignin carbohydrate complexes (LCC) are not obtained or separated.

According to WO 2007/129921 biomass is treated at elevated temperatures in order to dissolve hemicellulose. Hemicellulose is rather heavily degraded upon heating. An enzymitc treatment follows whereby cellulose becomes unusable for further application. An aqueous treatment at elevated temperatures is also described in U.S. Pat. No. 8,309,694.

In conclusion of above delignification methods, which are not able to selectively separate free-sugar lignin, LCC and hemicellulose and which are operated under conditions, wherein all said three components are dissolved in one step, face the problem that the sugars are to separated from the lignin to obtain free-sugar lignin. This is a tedious procedure, which requires complete polymeric sugar degradation and might cause great chemical changes in the lignin polymeric structure. The organosolv techniques that might imply the selective free-lignin extraction (for example as described in WO2011/014894, US20100159522, US 2013/0005952) do not indicate a way for LCC isolation. The LCC must be either combined with the sugar free lignin stream after the LCC extraction, if the LCC is unintentionally dissolved from the solid material during the treatment or organic solvent recovery, or must be left as a solid material after the isolation of the sugar free lignin solution from said solid material. In the first case the problem of separating sugars to obtain sugar free lignin has to be overcome. In the second case the organic solvent recovery from the solid material obtained after the lignin isolation might be hindered. The LCC presence might also significantly contaminate the solid material obtained after the lignin isolation.

Methods of Separating LCC from Lignoncellulosic Material

Historically the LCC isolation was realized to investigate the LCC structure in the natural material. The pioneering work in this field was done by Björkman (Björkman, A. Svensk. Papperstidn. (1956) 59, 477-485; Björkman, A. Svensk. Papperstidn. (1957) 60, 243-251), who invented method of separating lignin from the lignocellulosic material to give a chemically unchanged lignin (milled wood lignin (MWL)) in relatively high yield (≈25%) after ball milling of the material. The lignin is extracted by use of a dioxane-water mixture. The further extraction of the residue with organic solvents (dimethyl sulfoxide (DMSO), dimethyl formamide (DMF), and acetic acid:water mixtures) gives LCC (Björkman LCC) with a yield of ≈20%. Approximately 42% of the lignin remains in the material after extraction (see e.g. M. Lawoko, Doctoral Dissertation (2005), Royal Institute of Technology, Stockholm).

To obtain LCC in an amount which corresponds to almost quantitative lignin yield the enzymatic hydrolysis is used. For that the lignocellulosic material is treated with cellulases to make the LCC easy accessible. For the enzymatic treatment a grinding step is also required since the enzymes are not able to penetrate the lignocellulosic matrix without a mechanical treatment (see e.g. Methods in Lignin Chemistry, edited by S. Y. Lin and C. W. Dence, Springer-Verlag Berlin Heidelberg 1992). The subsequent extraction of the enzymatically treated lignocellulosic material yields the LCCs.

Some examples for LCC separation described in the literature are given below:

I. M. Morrison (I. M. Morrison, Phytochemistry (1973) 12, 2979-2884) presents results of LCC isolation from *Lolium Multiflorum*. The material was ball milled which could greatly enhance the LCC yield. Some solvents were tried for LCC isolation. DMSO and aqueous NaOH gave the highest yields.

T. Koshijima et. al (Koshijima et. al, Carbohydrate Research (1981) 93, 91-104) characterize the LCC isolated from *Pinus densiflora*. The MWL isolated by the Björkman method was fractionated by dialysis providing the carbohydrate-less lignin fraction (sugar<0.92%) and water soluble LCC (sugar content 38-73%).

I. M. Morrison (Phytochemistry (1974) 13, 1161-1165) describes isolation of the LCC and lignin-hemicellulose complex (LHC) from *Lolium perenne*. The LCC isolation was done with DMSO following by 0.1 N NaOH extraction to isolate LHC. The LCC yield was found between 7.20 and 14.31% depending on extraction from leaves or stems.

J. A. Lomax et. al (J. A. Lomax et. al., Carbohydrate Research (1988) 177, 127-151) report an extraction of LCC from sheep rumen fluid. The LCC consist of polyphenolic material in association with carbohydrate (5.5%) and protein (1.8%). The LCC from the grass was extracted with DMSO after intensive milling for comparison.

A method for the quantitative isolation of lignin-carbohydrate complexes (LCCs) in a softwood is presented by G. Gellerstedt (G. Gellerstedt et. al, Holzforschung, (2006) 60, 156-161). The lignocellulosic material was partially hydrolyzed by a cellulase and a xylanase. The four major LCC fractions were isolated by swelling in urea : galactoglucomannan LCC (≈8% lignin), a glucane LCC (≈4% lignin), xylan-lignin-glucomannan network LCC (≈40% lignin), glucomannan-lignin-xylan network LCC (≈48% lignin).

A method of isolating LCCs from maize straw was described by M. H. Sipponen et. al (M. H. Sipponen et. al, Bioresource Technology (2013) 133, 522-528). Maize straw was sequentially extracted with NaOH before and after endoglucanase treatment providing two lignin LCCs comprising 39% and 8% of total lignin.

A modern concept of isolating of LCCs consists in complete dissolution of lignocellulosics and its fractional precipitating to obtain LCCs with different sugars content. The possible solvents could be dimethylacetamide (DMAc) containing 8% LiCl (Sjöholm, E et. al, Carbohydr. Polym. (2000) 41, 153-61); DMSO containing 16.25% tetrabutylammonium fluoride (Lu, F., Ralph, J. Plant J. (2003) 35, 535-544); DMSO-tetrabutylammonium hydroxide (TBAH) (Lidbrandt, O., SE 461277). J. Li et. al concluded the DMSO-TBAH to be superior over other systems (J. Li et. at, Holzforschung, (2011) 65, 43-50). The fractionation of wood or pulp (*Eucalyptus globulus*) into LCCs with different molecular weight distributions and sugar content was described.

In conclusion of the above, the selective LCC isolation might be in general accomplished. However, for LCC isolation the complete cellulosic material degradation, either mechanically or enzymatically is required in most cases. The known procedure to isolate LCC does not imply the isolation of the sugar free lignin at once, thus making tedious purification necessary. The yield of the sugar free lignin is not higher than 50%.

According to the present invention a number of measures from prior art processes can be avoided. According to the present invention no sulfite or oxygen treatment is carried out;
no milling of the—e.g. pretreated—biomass is carried out;
no impregnation and pre-extraction of the biomass with organic solvent is carried out;
no bleaching of cellulose pulp is carried out;
no elevated temperatures are used in the process(es) of the present invention;
no enzymitc step is carried out.

DETAILED DESCRIPTION OF THE PRESENT INVENTION

The present invention provides a method for isolation of sugar free lignin by extraction providing conditions to retain LCC, hemicellulose in the solid cellulosic material enriched with LCC and hemicellulose. The present invention provides the separation of the sugar free lignin solution from the solid cellulosic material enriched with LCC and hemicellulose and the isolation of the sugar free lignin in pure form.

The further extraction of LCC from said cellulosic material and its selective isolation allow avoiding the contamination of the sugar free lignin.

The present invention thus offers a possibility of extracting lignin in its pure form, which can be utilized in the production of high value synthetic polymers and separating the LCC from the other lignocellulosic fractions.

In one aspect the present invention provides a method for the isolation of lignin from a lignocellulosic biomass, which method comprises
(a) providing a lignocellulosic biomass;
(b) extracting sugar free lignin from the lignocellulosic biomass by contacting said biomass with an organic aqueous solution comprising water and at least one water miscible organic solvent, in particular an alcohol, particularly under conditions that promote the retention of the lignin carbohydrate complexes, hemicellulose and cellulose in the solid material, whereby a biomass-solvent suspension is formed;
(c) separating the sugar free lignin solution from the biomass-solvent suspension to obtain a sugar free lignin solution and a cellulosic material enriched with lignin carbohydrate complexes and hemicellulose, and optionally isolating sugar free lignin from the sugar free lignin solution;
(d) extracting the lignin carbohydrate complexes from the cellulosic material enriched with lignin carbohydrate complexes and hemicellulose by contacting said cellulosic material with a liquid comprising at least water, in particular under conditions that promote the retention of hemicellulose in the cellulosic material, whereby treated biomass suspension is formed;
(e) separating the lignin carbohydrate complexes solution from said treated biomass suspension obtained in step (d) to obtain an lignin carbohydrate complexes solution and cellulosic material enriched with hemicellulose, and, optionally
(f) isolating lignin carbohydrate complexes from the solution obtained in step (e) and isolating further sugar free lignin from the mother liquor of said lignin carbohydrate complexes isolation, optionally after combining the mother liquor of said lignin carbohydrate complexes LCC isolation with the sugar free lignin solution obtained in step (c).

A process (method) provided by the present invention is herein designated as "A process (method) of (according to) the present invention.

Definitions

The following definitions are used herein:

Sugar free lignin: lignin fraction containing 2.5% and less, preferably less than 1% of the covalently bound sugars.

Lignin carbohydrate complex (LCC): the mixed lignin carbohydrate fraction in which the oligomeric or polymeric sugars are covalently bound to the lignin and the sugar content is more than 10%, preferably more than 20%.

Lignocellulosic biomass (lignocellulosics, lignocellulosic material): the material comprising the lignin, hemicellulose and cellulose in different proportions. The material has a natural origin and might comprise annual or perennial plants.

Overall lignin: the initial amount of lignin in the lignocellulosic material before any treatment determined as acid-insoluble (Klasson) lignin Lignin content: the weight percentage of the lignin in the cellulosic or lignocellulosic material (determined as acid-insoluble (Klasson) lignin) relative to the mass of the material.

Cellulosic material: material comprising cellulose.

Cellulosic material enriched with LCC and hemicellulose: material comprising LCC, hemicellulose and cellulose after the sugar free lignin is removed from said material. The lignin content of said material is not higher than 30%, preferably 20%, most preferably 15%.

Cellulosic material enriched with hemicellulose: material comprising hemicellulose and cellulose after the sugar free lignin and LCC are removed. The lignin content of said material is no higher than 20%, preferably 10%, most preferably 5%.

Aqueous organic solution: a homogeneous solution comprising water and at least one water miscible organic solvent, preferably $C_1$-$C_4$ alcohol selected from, but not limited to, the group of methanol, ethanol, isopropanol, n-propanol, n-butanol, isobutanol and t-butanol, or individual mixtures from two or more thereof, most preferably methanol or ethanol. The organic aqueous solution may contain one or more additional components.

Sugar free lignin solution: a solution of sugar free lignin in aqueous organic solution.

LCC solution: a solution of LCC in organic aqueous solution or water.

Biomass-solvent suspension: a suspension of the sugar free lignin solution and cellulosic material enriched with LCC and hemicellulose.

Treated biomass suspension: the suspension of LCC solution and cellulosic material enriched with hemicellulose.

Particle size: the longest dimension of the particle of the lignocellulosic or cellulosic material. This term also refers to the length of particle of the lignocellulosic material or the length of fibers in the cellulosic material (pulp).

Dry weight of lignocellulosic or cellulosic material: the weight of the lignocellulosic material after the removal of water or other volatile components at 105° C. (according to method TAPPI T-412om11).

Room temperature or ambient temperature: any temperature from 18° C. to 25° C.

Sugar free lignin extraction kinetic: the rate (derivative of the sugar free lignin concentration in the solution in respect to time) of the sugar free lignin dissolution from the lignocellulosic material.

Sugar free lignin yield: the ration of the sugar free lignin dissolved by contacting the aqueous organic solution with the lignocellulosic material to the overall lignin in the lignocellulocis material.

Consistency: the weight percentage of the dry weight of solid material in the suspension or reaction mixture relative to the whole mass of the suspension or reaction mixture.

Sugar free lignin extraction: the process of dissolution of the sugar free lignin by contacting aqueous organic solution with the lignocellulosic material.

LCC suspension: a suspension of LCC in the aqueous organic solution formed after the addition of water miscible organic solvent, preferably alcohol to the LCC solution.

Mother solution after LCC separation: an aqueous organic solution obtained by LCC separation from the LCC suspension.

Aqueous alkali solution: a water solution comprising at least an inorganic base selected from, but not limited to sodium hydroxide, sodium carbonate, potassium hydroxide, potassium carbonate, calcium hydroxide, calcium carbonate, ammonia, or any mixtures thereof.

Lignocellulosic Material and Cellulosic Material

The definition "lignocellulosic biomass (material), lignocellulosics, lignocellulose" herein includes, but is not limited to biorefinery crops comprising lignocellulose, e.g. including agricultural residues.

In one embodiment of the present invention, the lignocellulosic biomass used in a process of the present invention includes agricultural residues such as straw, e.g. wheat straw, barley straw, oat straw, rice straw, canola straw; grasses, e.g. including energy crops, such as switch grass, miscanthus, cord grass, reed canary grass, elephant grass; stover, e.g. soybean stover; sorghum, corn stover, fiber process residues such as sugar cane bagasse; husk, hay, soy and individual combinations from two or more thereof.

Example of lignocellulosic biomass include miscanthus, sugar cane bagasse, soybean stover, corn stover, rice straw, barley straw, wheat straw, rice straw, energy crops, especially elephant grass, switch grass and/or husk, hay, soy and individual combinations from two or more thereof thereof.

In another embodiment, the lignocellulosic biomass in a process of the present invention comprises one kind of biomass, for example wheat straw. The lignocellulosic biomass may be delivered from the one source or may be a mixture comprising the material delivered from different sources, for example wheat straw harvested in north and south of one country, or from different countries.

The lignocellulosic biomass in a process of the present invention may be utilized directly as obtained or the particle size of the material may be diminished, e.g. its size may be reduced, e.g. by mechanical treatment. Appropriate size reduction methods include e g milling, crushing, grinding, shredding, chopping, disc refining.

According to the present invention it was surprisingly found that the particle size reduction in a process of the present invention does not affect sugar free lignin or LCC extraction kinetics. However, the particle size may affect such parameter of the biomass-solvent suspension or/and of the treated biomass suspension, e.g. pumpability, filterability or miscibility of the suspension. The particle size and the reduction method should be chosen in such a way, that those parameters are optimal, e.g. the particle size and the reduction method should be chosen in such a way, that it does not affect the properties of the cellulosic material, for example the molecular weight of the cellulosic material.

In one embodiment of the present invention the particle size of the (ligno)cellulosic biomass used in a process of the present invention is from 0.2 cm to 10 cm, preferably from 2 cm to 5 cm.

In a process of the present invention the particle size reduction may occur before or after contacting the lignocellulosic biomass with the aqueous organic solvent, e.g. the particle size reduction may occur after the separation of the sugar free lignin solution, i.e. applied to cellulosic material enriched with LCC and hemicellulose, or the particle size reduction may occur after the separation of LCC solution, i.e. applied to cellulosic material enriched with hemicellulose.

Sugar Free Lignin Extraction and Biomass-solvent Suspension Formation

The aqueous organic solution for the sugar free lignin extraction in a process of the present invention comprises water and at least one water miscible organic solvent, e.g. alcohol, preferably $C_1$-$C_4$ alcohols, such as methanol, ethanol, isopropanol, n-propanol, n-butanol, isobutanol, t-butanol, or individual mixtures from two or more thereof, most preferably methanol or ethanol.

The concentration of organic solvent in the aqueous organic solution used for sugar free lignin extraction according to the present invention may be from 10% to 90% by weight, preferably from 30% to 70% by weight, most preferably from 40% to 60% by weight.

According to the present invention it was surprisingly found that sugar free lignin can be extracted from the lignocellulosic biomass by contacting said biomass with an aqueous organic solution under certain condition parameters which prevent the dissolution of the LCC, hemicellulose and cellulose. These conditions parameters include temperature, time, solvent-to-water ratio, consistency and the optional presence of any further components in the aqueous organic solution, such as a base or a catalyst which either may enhance the sugar free lignin extraction by reducing the extraction time and/or which may increase the sugar free lignin yield.

According to the present invention it was unexpectedly observed that the addition of an inorganic base to the aqueous organic solution in a process according to the present invention may dramatically increase the yield of the sugar free lignin.

In one embodiment of the present invention, the aqueous organic solution in a process of the present invention contains an inorganic base, e.g. selected from hydroxides, e.g. sodium hydroxide, potassium hydroxide, calcium hydroxide; carbonates, e.g. sodium carbonate, potassium carbonate, calcium carbonate, ammonia, and individual mixtures from two or more thereof as an additional component.

In one embodiment of the present invention sodium hydroxide is used as an additional component. An appropriate amount of the inorganic base in a process of the present invention includes an amount in the range from 1% to 30% related to the dry weight of the lignocellulosic material, more preferably from 5% to 20%, most preferably from 8% to 15%.

In a process of the present invention the inorganic base can be added to the aqueous organic solution before or after said solution is brought into contact with lignocellulosic material. In another aspect the inorganic base can be added in parts e.g. before and/or after the aqueous organic solution is brought in contact with the lignocellulosic material.

For example, a certain amount, e.g. 6% of the inorganic base calculated relative to dry weight of the lignocellulosic material, may be added to the aqueous organic solution before the solution is brought in contact with the lignocellulosic material and 6% of the inorganic base may be added to the biomass-solvent suspension, i.e. after the aqueous organic solution is brought in contact with the lignocellulosic material.

In a further aspect the inorganic base is continuously added to the biomass-solvent suspension in a process of the present invention, e.g. until the sugar free lignin concentration in the sugar free lignin solution stops changing or the changing rate of the sugar free lignin concentration in the solution is no longer higher than 1% per hour.

In one particular embodiment of the present invention the addition of an inorganic base, continuously or discontinuously, is carried out in a way that a pH of the biomass solvent suspension of 13.5 and less, preferably 13.0 and less, most preferably 12.5 and less, is adjusted.

In one embodiment of the present invention anthraquinone may be added to the aqueous organic solution in a process of the present invention. Surprisingly it was observed that the anthraquinone may enhance the sugar free lignin extraction kinetic and yield. An appropriate amount of anthraquinone includes a range from 0.01% to 1% relating to the dry weight of the lignocellulosic material used, more preferably from 0.05% to 0.15%.

In one embodiment of the present invention the aqueous organic solution in a process of the present invention is brought into contact with the lignocellulosic biomass at appropriate temperatures, e.g. room temperature, or at elevated temperatures, e.g. at temperatures from 50° C. to 210° C., more preferably from 70° C. to 150° C., to form biomass-solvent suspension.

The formed biomass-solvent suspension is heated to elevated temperatures, such as temperatures from 50° C. to 210° C., more preferably from 70° C. to 150° C. The contacting is continued at elevated temperatures until the sugar free lignin concentration in the sugar free lignin solution stops changing or the changing rate of the sugar free lignin concentration in the solution is no longer higher than 1% per hour.

In one aspect, in a process of the present invention the aqueous organic solution is brought into contact with the lignocellulosic biomass at elevated temperatures, e.g. at temperatures from 50° C. to 210° C. to form the biomass-solvent suspension. The contacting is continued at the elevated temperature for a period of time sufficient to extract at least 10% of the sugar free lignin. The biomass-solvent suspension may be heated to a temperature higher than the temperature at which the aqueous organic solvent was brought into contact with the lignocellulosic material and the contacting may be continued at the elevated temperature to which the biomass-solvent suspension was heated. The temperature increase may be repeated several times.

In another embodiment in a process of the present invention the temperature of the biomass-solvent suspension is continuously increased until the sugar free lignin concentration in the sugar free lignin solution stops changing or the changing rate of the sugar free lignin concentration in the solution is no longer higher than 1% per hour.

In a process of the present invention the contacting of the aqueous organic solution with the lignocellulosic biomass should be continued until the sugar free lignin concentration in the sugar free lignin solution stops changing or the changing rate of the sugar free lignin concentration in the solution is no higher than 1% per hour. Conveniently the contacting time of the aqueous organic solution with the lignocellulosic material may be continued for a period of time in the range of 10 minutes to 24 hours, more preferably from 30 minutes to 18 hours, most preferably from 1 hour to 3 hours.

According to the present invention it was surprisingly found that for efficient extraction of the sugar free lignin and the retention of LCC, hemicellulose and cellulose in a process of the present invention certain reaction parameters are highly effective, namely Use of wheat straw as lignocellulosic material;
Use of ethanol as an organic solvent;
Use of an organic solvent content of 45% to 60%, e.g. 50% to 55%, such as 52% by weight of the aqueous solution;
Use of sodium hydroxide as an inorganic base;
Use of an amount of inorganic base in the range of 8% to 15%, such as 10% by weight related to the dry weight of the lignocellulosic material,
Use of a contacting temperature of the aqueous organic solution with the lignocellulosic material of 65° C. to 160° C., e.g. 140° C.,
Use of a contacting time of the aqueous organic solution with the lignocellulosic material of 0.5 to 18 hours, e.g. 1 hour.
Use of antrachinone in the range of 0.05% to 0.15%, such as 0.10% by weight related to the dry weight of the lignocellulosic material.

E.g., if a combination of the above measures was used in a process of the present invention an extraction of the lignin having a covalently bound sugar content of ca. 1.5% and less was achieved, i.e. sugar free lignin was obtained.

In a process of the present invention the contacting of the aqueous organic solution with the lignocellulosic material to extract the sugar free lignin from said material may be conducted discontinuously or continuously, e.g. in batch.

In one preferred embodiment the sugar free lignin extraction in a process of the present invention is conducted continuously, preferably using a continuous co-current or counter-current method.

The consistency of the reaction mixture should be chosen such, that optimal pumpability, filterability and/or miscibility of the biomass-suspension is achieved. An appropriate consistency includes a range of 5% to 30%, preferably 7% to 15, most preferably from 9% to 12.

According to our observations in a process of the present invention the extraction rate and the yield of the sugar free lignin is practically not affected by the consistency of the reaction mixture.

Separation of the Sugar Free Lignin Solution from the Biomass-solvent Suspension In a process of the present invention the sugar free lignin solution is separated from the biomass-solvent suspension. The separation may be conducted by a method as appropriate, e.g. by sedimentation, filtration, centrifugation, pressing or any variations and/or combinations thereof.

In one embodiment of the present invention the sugar free lignin solution is separated from the biomass-solvent suspension by pressing the biomass-solvent suspension whereby the cellulosic material enriched with LCC and hemicellulose and a solution of the sugar free lignin are obtained.

The biomass-solvent suspension may be cooled, e.g. to room temperature, before the sugar free lignin is separated from said suspension, or the sugar free lignin solution is separated at elevated temperatures, e.g. at temperatures in a range from 50° C. to 210° C., preferably from 70° C. to 150° C., most preferably at that temperature at which the sugar free lignin extraction was conducted.

In a process of the present invention the separation of the sugar free lignin solution from the biomass-solvent suspension is conducted discontinuously or continuously.

In one particular embodiment of the present invention a portion of the aqueous organic solution may be brought into contact with the biomass-solvent suspension to extract the additional amount of the sugar free lignin solution. The composition of said solution is chosen in a way that the content of the organic solvent, e.g. alcohol in said solution is equal or higher than the content of the aqueous organic solution used for the sugar free lignin extraction. The contacting may be conducted at room temperature or at elevated temperatures, e.g. at temperatures in a range from 50° C. to 210° C., preferably from 70° C. to 150° C., most preferably at that temperature at which the sugar free lignin extraction was conducted.

Sugar Free Lignin Isolation from the Sugar Free Lignin Solution

In a process of the present invention the sugar free lignin may be isolated from the sugar free lignin solution. That isolation may be accomplished as appropriate, e.g. by a method as conventional, e.g. by evaporation of the organic solvent from the sugar free lignin solution, nano-filtration of the sugar free lignin solution, pH lowering of the sugar free lignin solution, solid-liquid separation of the solid-liquid separation of the sugar free lignin from the suspension, if said suspension is formed while applying any method mentioned above, or by any combination of such individual methods. The evaporation of the organic solvent solution may be conducted as appropriate, e.g. as a flash distillation, e.g. followed by organic solvent fractionation. The nano-filtration may be conducted as appropriate, e.g. using a suitable membrane that allows sugar free lignin retention. The pH lowering can be accomplished as appropriate, e.g. by addition of an acid, such as an inorganic acid, e.g. nitric acid, sulfuric acid, hydrochloric acid, phosphoric acid, carbon dioxide, sulfur dioxide, sulfur trioxide or any combination thereof, to the sugar free lignin solution. In one particular embodiment of the present invention the pH of the sugar free lignin solution may be lowered by electrolysis. Appropriate liquid-solid separation methods for the sugar free lignin recovery e.g. include sedimentation, filtration, centrifugation, flotation, flocculation, hydro cyclonic separation, any combination and/or any modification thereof.

LCC Extraction

According to the present invention it was surprisingly found that the cellulosic material enriched with LCC and hemicellulose after the separation of the sugar free lignin solution contains amounts of LCC. Unexpectedly the LCC can be extracted from the said cellulosic material by contacting the said material with a liquid comprising at least water.

In one embodiment of the present invention the LCC is extracted from the cellulosic material enriched with LCC and hemicellulose by contacting said cellulosic material with an aqueous solution, e.g. water or an aqueous alcoholic solution, e.g. such as used in a process of the present invention for the extraction of lignin, but containing less alcohol than the aqueous organic solution used for sugar free lignin extraction. The LCC extraction may be conducted at appropriate temperatures from the cellulosic material enriched with hemicellulose, e.g. at temperatures from $-20°$ C. to $210°$ C., preferably from $0°$ C. to $70°$ C., most preferably at room temperature.

In another embodiment in a process of the present invention the LCC is extracted from the cellulosic material enriched with LCC and hemicellulose by contacting said cellulosic material with an aqueous organic solution that contains 20% of organic alcohol and less, preferably 10% and less, most preferably the LCC is extracted from the cellulosic material enriched with LCC and hemicellulose with water, e.g. without any organic solvent.

According to the present invention LCC may be extracted from the cellulosic material enriched with LCC and hemicellulose continuously or discontinuously, preferably continuously, e.g. using a continuous co-current or counter-current method.

Separation of the LCC Solution from the Treated Biomass Suspension

In a process of the present invention a biomass suspension comprising cellulosic material enriched with hemicellulose is formed after the LCC is extracted. The LCC solution is to be separated from the biomass suspension. Separation may be conducted as appropriate, e.g. by a method as conventional, e.g. by sedimentation, filtration, centrifugation and pressing, or any variation or combination thereof.

In one embodiment of the present invention the LCC solution is separated from the treated biomass suspension by pressing the biomass suspension whereby the cellulosic material enriched with hemicellulos is obtained. The biomass suspension may be brought to room temperature before the LCC solution is separated from said suspension, or the LCC solution is separated at the temperature at which the LCC extraction was conducted.

LCC Isolation from the LCC Solution

According to the present invention it was surprisingly found that the addition of water miscible organic solvent, e.g. an alcohol, to the LCC solution obtained as described above or pH lowering of the LCC solution, or any consecutive combination thereof result in precipitation of LCC from said solution, whereby a LCC suspension is formed.

In one embodiment of the present invention the water miscible organic alcohol used for LCC precipitation is the same that was used in the sugar free lignin extraction, e.g. in one particular embodiment the water miscible organic solvent is ethanol or methanol. An appropriate amount of the water miscible organic solvent to be added to cause LCC precipitation is a concentration of the water miscible organic solvent in the formed LCC solution from 10% to 90%, preferably from 30% to 70%, more preferably from 40% to 60%, most preferably the organic solvent is present in an amount equal to the concentration in the organic aqueous solution used for the sugar free lignin extraction. The pH lowering can be accomplished as appropriate, e.g. by addition of an acid, such as an inorganic acid, e.g. nitric acid, sulfuric acid, hydrochloric acid, phosphoric acid, carbon dioxide, sulfur dioxide, sulfur trioxide or any combination thereof, to the sugar free lignin solution. In one particular embodiment of the present invention the pH of the sugar free lignin solution may be lowered by electrolysis. In one embodiment of the present invention LCC solution may be concentrated by means of nano-filtration before water miscible organic solvent addition or pH lowering are applied. The nano-filtration may be conducted as appropriate, e.g. using a suitable membrane that allows LCC retention.

From the LCC suspension obtained according to the present invention LCC may be separated as appropriate, e.g. by a liquid-solid separation method such as sedimentation, filtration, centrifugation, flotation, flocculation, hydro cyclonic separation, any combination and/or any modification thereof, whereby the mother solution after LCC separation is obtained.

In one embodiment of the present invention the mother solution after LCC separation is used to extract the sugar free lignin from the lignocellulosic material after appropriate dosage of an inorganic base, organic solvent, catalyst or water to said mother solution.

According to the present invention unexpectedly it was found that a part of the sugar free lignin may be recovered from the mother solution after LCC separation. The sugar free lignin may be isolated from the mother solution after LCC separation by a method as appropriate, e.g. by evaporation of the organic solvent from the sugar free lignin solution, nano-filtration of the sugar free lignin solution, pH lowering of the sugar free lignin solution, solid-liquid separation of the sugar free lignin from the suspension or by any combination of such methods.

In a process according to the present invention optionally the mother solution after LCC separation may be combined with the sugar free lignin solution, whereby the sugar free lignin isolation is accomplished by a method as appropriate, e.g. by a method as described above for isolation of the sugar free lignin.

Extraction of Hemicellulose from the Cellulosic Material

In a process of the present invention after LCC separation the cellulosic material enriched with hemicellulose is obtained. From said material hemicellulose may be obtained, e.g. as appropriate, e.g. by at least one chemical or enzymatic method or by any combination thereof.

In one embodiment hemicellulose is separated from the cellulosic material by a chemical method, whereby the cellulosic material enriched with hemicellulose is treated with an aqueous base, e.g. an alkaline solution, at a temperature in the range from 20° C. to 150° C. for an appropriate period of time, e.g. from 10 minutes to 3 hours.

In another embodiment hemicellulose is separated from the cellulosic material by an enzymatic method, whereby the cellulosic material enriched with a hemicellulose is treated by at least one carbohydrate splitting enzyme at an appropriate temperature, e.g. in the range of 10° C. to 120° C., e.g. for a period of time from 10 minutes to 3 days.

Advantages of the Present Invention

One of the advantages of the present invention is a high selectivity. The present invention provides a method for isolation of lignin from biomass which lignin is practically sugar free, i.e. which is practically not contaminated by sugars. Such lignin due to its high purity may be successfully utilized in production of a high value polymeric material on the basis of a the renewable material lignin.

In another aspect the present invention provides a highly selective method for recovery of LCC from the cellulosic material after sugar free lignin is extracted. LCC is a part of a biomass comprising lignin and sugar which may be fractionated and utilized. As a result the overall biomass recovery may be highly improved.

In another aspect the present invention provides a highly selective method to obtain hemicellulose comprising practically no lignin. The low lignin content in the hemicellulose is a result of the selective sugar free lignin and LCC extraction. The hemicellulose furthermore may be separated from the cellulosic material in a pure form. In such a way the present invention provides the most effective manner to use the biomass whereby all major components of biomass are selectively separated.

In a further aspect, even more sugar free lingnin may be obtained from the mother liquor of LCC separation.

According to the present invention it was found that the sugar free lignin extracted from the lignocellulosic biomass constituted from 50% to 95% of overall lignin in the lignocellulosic biomass e.g. even 70% to 90%, such as 75% to 80%. Thus, an unexpected high amount of lignin can be isolated with an unexpected low content of bound sugars

EXAMPLE 1

30 g of wheat straw (21% lignin content, particle size ≈2 cm) were contacted with a solution comprising water and 52% by weight of EtOH in the presence of 10% NaOH (related to the dry mass of the straw) at 90° C. for 3 hours. The consistency of the reaction mixture was 10% at the beginning. A sugar free lignin solution was separated by filtration at 90° C. From the solution obtained ethanol was evaporated and sulfuric acid was added. Lignin was precipitated, the mixture comprising the precipitated lignin was subjected to centrifugation and the solid obtained was washed with water. The yield of the sugar free lignin was 3.3 g. Sugar content: 2.0% by weight. (0.2% arabinose, 0.2% xylose, 0.1% mannose, 0.1% galactose, 1.4% glucose).

The press cake obtained after the sugar free lignin separation was extracted with water (7×20 ml) at room temperature to obtain an LCC solution. 127 g of LCC solution were collected. To the LCC solution obtained 119.8 g of 95% EtOH were added, LCC precipitated and was isolated. Yield: 1.5 g The LCC composition obtained contained 10.8% by weight lignin and 79.6% by weight of sugars (20.2% arabinose, 41.2% xylose, 0.3% mannose, 11.1% galactose, 6.9% glucose).

EXAMPLE 2

15 g of wheat straw (21% lignin content, particle size ≈2 cm) were contacted with a solution comprising water and 52% by weight of EtOH in the presence of 12% NaOH (related to the dry mass of the straw) at 140° C. for 1 hours. The consistency of the reaction mixture was 10% at the beginning.

A sugar free lignin solution was separated by filtration at room temperature.

From the solution obtained ethanol was evaporated and sulfuric acid was added.

Lignin was precipitated, the mixture comprising the precipitated lignin was subjected to centrifugation and the solid obtained was washed with water.

The yield of the sugar free lignin was 1.86 g. Sugar content: 1.3% by weight. (0.2% arabinose, 0.2% xylose, 0.1% galactose, 0.8% glucose).

The press cake obtained after the sugar free lignin separation was extracted with water (6×20 ml) at room temperature to obtain an LCC solution. 109.8 g of LCC solution were collected.

To the LCC solution obtained 116 g of 95% EtOH were added, LCC precipitated and was isolated. Yield: 0.59 g

EXAMPLE 3

1500 g of wheat straw (21% lignin content, particle size ≈2 cm) were contacted with a solution comprising water and 52% by weight of EtOH in the presence of 10% NaOH (related to the dry mass of the straw) at 70° C. for 18 hours. The consistency of the reaction mixture was 10% at the beginning. A sugar free lignin solution was separated by by pressing the reaction suspension at room temperature. From the solution obtained ethanol was evaporated and sulfuric acid was added. Lignin was precipitated, the mixture comprising the precipitated lignin was subjected to centrifugation and the solid obtained was washed with water.

The yield of the sugar free lignin was 150.3 g. Sugar content: 0.8% by weight. (0.1% arabinose, 0.1% xylose, 0.6% glucose).

The press cake obtained after the sugar free lignin separation was extracted with water (6×1200 ml) at room temperature to obtain an LCC solution. 6372 g of LCC solution were collected.

To the LCC solution obtained 6395 g of 95% EtOH were added, LCC precipitated and was isolated. Yield: 55.2 g.

The LCC composition obtained contained 12.0% by weight lignin and 81.3% by weight sugars (20.8% arabinose, 41.4% xylose, 0.2% nannose, 10.7% galactose, 8.2% glucose).

EXAMPLE 4

The sugar free lignin solution and LCC solution were obtained similar to example 3. The obtained solutions were mixed together to demonstrate the difficulties to precipitate the sugar free lignin from the solution comprising also LCC. From the solution obtained ethanol was evaporated and sulfuric acid was added. Lignin was precipitated, the mixture comprising the precipitated lignin was subjected to centrifugation and the solid obtained was washed with water.

The yield of the sugar free mixed lignin was 167.8 g. Sugar content: 3.3% by weight. (0.3% arabinose, 0.8% xylose, 0.3% galactose, 1.9% glucose). The sugar content of the isolated lignin is almost 2 fold higher.

The invention claimed is:

1. A method for the isolation of lignin from a lignocellulosic biomass, comprising
    (a) providing a non-milled lignocellulosic biomass;
    (b) extracting sugar free lignin from the non-milled lignocellulosic biomass by contacting said biomass with a first organic aqueous solution comprising water and at least one water miscible alcohol, either discontinuously or continuously, to form a biomass-solvent suspension;
    (c) separating a sugar free lignin solution from the biomass-solvent suspension, wherein a remainder of the biomass-solvent suspension includes a cellulosic material enriched with lignin carbohydrate complexes and hemicellulose;
    (d) contacting the remainder of the biomass-solvent suspension with a second organic aqueous solution comprising water and at least one water miscible alcohol to extract additional sugar free lignin and form additional sugar free lignin solution;
    (e) extracting the lignin carbohydrate complexes from the cellulosic material enriched with lignin carbohydrate complexes and hemicellulose by contacting said cellulosic material with an extraction liquid comprising at least water at a temperature of from 0° C. to 70° C., whereby a treated biomass suspension is formed; and
    (f) separating the lignin carbohydrate complexes from said treated biomass suspension obtained in step (e) to obtain a lignin carbohydrate complexes solution and cellulosic material enriched with hemicellulose,
    wherein the method optionally includes isolating sugar free lignin from the sugar free lignin solution.

2. The method according to claim 1, wherein, the content of water miscible alcohol in the first and second organic aqueous solutions is from 10% to 90% by weight.

3. The method according to claim 1, wherein the contacting of the lignocellulosic material with the first organic aqueous solution in step (b) is carried out at elevated temperature.

4. The method according to claim 3, wherein the elevated temperature is in a range from 50° C. to 210° C.

5. The method according to claim 1, wherein separating the sugar free lignin solution in step (c) is carried out by filtration and/or pressing of the biomass-solvent suspension, optionally at elevated temperatures.

6. The method of claim 1, wherein the method includes isolating sugar free lignin from the sugar free lignin solution by at least one of the following isolation methods, or by any combination thereof:
    (a) evaporation of alcohol from the sugar free lignin solution,
    (b) nano-filtration of the sugar free lignin solution,
    (c) pH lowering of the sugar free lignin solution, or
    (d) solid-liquid separation of the sugar free lignin from a suspension formed while applying any combination of isolation methods (a) through (c).

7. The method of claim 1, wherein lignin carbohydrate complexes are extracted from the cellulosic material enriched with lignin carbohydrate complexes and hemicellulose in step (e) by contacting said cellulosic material with a third organic aqueous solution which contains a lower concentration of a water miscible alcohol than either the first organic aqueous solution used in step (b) or the second organic aqueous solution used in step (d).

8. The method of claim 1, wherein lignin carbohydrate complexes are isolated from the lignin carbohydrate complexes solution in step (e) by at least one of the following isolation methods, or by any combination thereof:
    (a) addition of a water miscible organic alcohol to said lignin carbohydrate complexes solution,
    (b) pH lowering of the lignin carbohydrate complexes solution, or
    (c) nano-filtration of lignin carbohydrate complexes solution,
    whereby a lignin carbohydrate complexes suspension is formed, from which suspension lignin carbohydrate complexes are isolated by a solid-liquid separation.

9. The method of claim 1, comprising isolating sugar free lignin from the lignin carbohydrate complexes solution formed in step (f).

10. The method of claim 1, further comprising separating hemicellulose from the cellulosic material enriched with hemicellulose by at least one chemical or at least one enzymatic method, or by any combination thereof.

11. The method of claim 1, wherein the lignocellulosic biomass is selected from miscanthus, sugar cane bagasse, soybean stover, corn stover, rice straw, barley straw, wheat straw, rice straw, energy crops, elephant grass, switch grass and/or husk, hay, soy, or any combination thereof.

12. The method of claim 1, further comprising:
    isolating lignin carbohydrate complexes from the lignin carbohydrate complexes solution obtained in step (f), and isolating further sugar free lignin from the lignin carbohydrate complexes solution, optionally after combining the lignin carbohydrate complexes solution with the sugar free lignin solution obtained in step (c) and the additional sugar free lignin solution obtained in step (d).

13. The method of claim 1, the first organic aqueous solution further comprising an inorganic base.

14. The method of claim 1, the first organic aqueous solution further comprising anthraquinone.

15. The method according to claim 1, wherein the extraction liquid of step (e) is an aqueous solution containing 20% or less of an organic alcohol.

16. The method according to claim 15, wherein the aqueous solution contains 10% or less of an organic alcohol.

17. The method according to claim 1, wherein the first and second organic aqueous solutions have equal contents of water miscible alcohol.

18. The method according to claim 1, wherein the second organic aqueous solution has a higher content of water miscible alcohol than the first organic aqueous solution.

* * * * *